United States Patent [19]

Mäkimaa

[11] 4,349,720
[45] Sep. 14, 1982

[54] COUPLING ARRANGEMENT FOR A WELDING APPARATUS

[75] Inventor: Toivo T. Mäkimaa, Lahti, Finland

[73] Assignee: Kemppi Oy, Lahti, Finland

[21] Appl. No.: 100,645

[22] Filed: Dec. 5, 1979

[30] Foreign Application Priority Data

Dec. 8, 1978 [FI] Finland .................................. 783784

[51] Int. Cl.³ .............................................. B23K 9/10
[52] U.S. Cl. ............................................. 219/130.33
[58] Field of Search ...................... 219/130.33, 130.51, 219/137 PS, 130.21

[56] References Cited

U.S. PATENT DOCUMENTS

| | | | |
|---|---|---|---|
| 3,928,746 | 12/1975 | Ericsson | 219/130.33 |
| 3,961,154 | 6/1976 | Ericsson | 219/130.33 |
| 4,201,906 | 5/1980 | Puschner | 219/130.33 |

Primary Examiner—C. C. Shaw
Attorney, Agent, or Firm—Bucknam and Archer

[57] ABSTRACT

Disclosed is a coupling arrangement of a DC welding apparatus, particularly intended for MIG welding. The coupling comprises a controllable fast DC voltage source, first circuit elements for detecting both load current and load voltage and for generating voltage signals corresponding thereto, second circuit elements for forming a control signal in response to said voltage signals so as to correspond to the values of desired current step and current increase rate in a drop short-circuit instance, and third circuit elements which receive the control signal and effect control of the voltage source in response thereto. Said second circuit elements may include means for receiving a setting signal by which the characteristic values of the current step and the current increase may be set and scaled and the open circuit-voltage of the voltage source can be determined.

6 Claims, 8 Drawing Figures

COUPLING ARRANGEMENT FOR A WELDING APPARATUS

BACKGROUND OF THE INVENTION

1. Field of the Invention

The present invention relates to a coupling arrangement for a welding apparatus intended in particular for MIG welding, the arrangement comprising a controllable direct-voltage source having a short reacting time.

2. Description of the Prior Art

In previously known welding apparatus which operate with direct voltage, the desired welding characteristics are obtained by means of suitably selected coupling in parallel of an inductance L and a resistance R, connected into the main current branch, as shown in accompanying FIG. 1. In this case, in a drop short-circuit situation the voltage U taken by the load changes as shown in FIG. 2a and the current I as shown in FIG. 2b. The change in current at the initial moment of the drop short-circuit is in this case $\Delta I = E/R$ and the current increase rate respectively $dI/dt = E/L$.

The welding characteristics of a welding apparatus are greatly dependent on these quantities, and various resistor-choke combinations must be connected to the circuit in order to adjust the characteristics to different situations. Owing to the high currents, the adjustment is difficult, and it is necessary to use large and expensive components. The quantity E is normally adjusted by means of a coil switch located on the primary side of the transformer, since phase control is not as such applicable to voltage control, with the exception of very narrow-range vernier control. The reason for this is the strong ripple caused by phase control, and for dynamic reasons this ripple cannot be eliminated by means of chokes.

It has turned out that by measuring the current and voltage of the apparatus and by electronically controlling, on the basis of the measured current and voltage, the direct-voltage source having a sufficiently short reacting time, the behavior illustrated in FIGS. 2a and 2b can be obtained without the described coupling in parallel of a resistor and a choke.

The present invention, which is based on this idea, provides a coupling arrangement of the character once described, which comprises a coupling arrangement for a welding apparatus intended in particular for MIG welding, the arrangement comprising:

a controllable voltage source having a short reacting time; a first set of circuit elements for detecting the current and voltage taken by the load and for forming voltage signals corresponding to these quantities;

a second set of circuit elements for forming a control signal corresponding to the said voltage signals so that in a drop short-circuit case, i.e. when the voltage suddenly drops to zero, the control signal corresponds to the values of the desired current step and the current increase rate; and a third set of circuit elements, which receive the control signal and which have been fitted to control the voltage source according to the control signal.

Thus, it is an object of the present invention to eliminate the above difficulties and to provide an electrically controllable source of welding current, in which the desired dynamic and static characteristics are obtained by means of electronic circuits and by applying the control technique approach.

DESCRIPTION OF THE PREFERRED EMBODIMENTS

Figure 1:
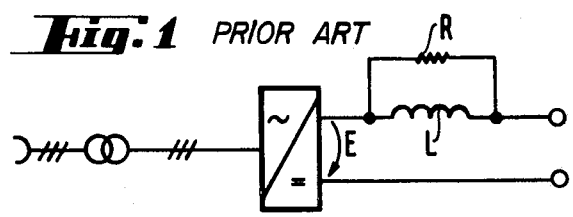
FIG. 1 shows a known coupling as described above.
Figures 3, 6:
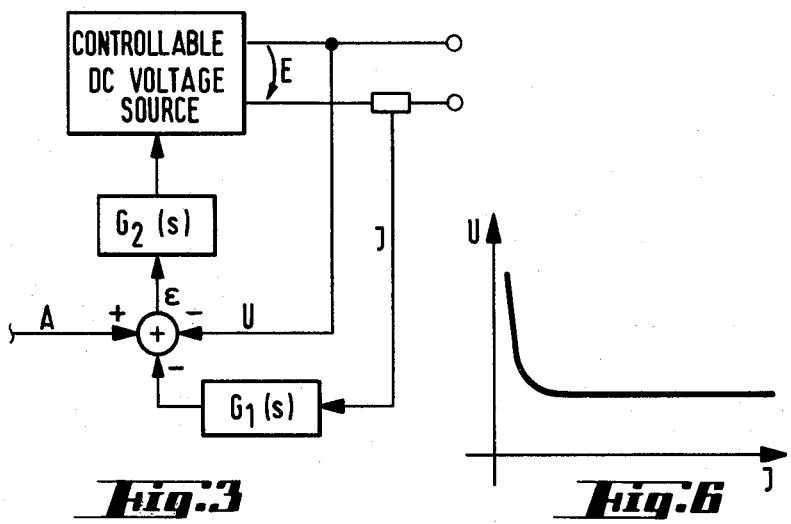
FIG. 3 shows diagrammatically the principle of the coupling arrangement according to the invention.
FIG. 6 shows a curve shape relating to the description of FIG. 5.

As stated above, the present invention aims to replace the resistor-choke combination, shown in FIG. 1, by an electronic circuit, and in this case the block diagram of FIG. 3 can be taken as the basis for the discussion of the control technique. In this block diagram the transfer function $G_2(s)$ is assumed to be such that the steady state control deviation $\epsilon$ is zero with sufficient accuracy. In addition, the dynamic characteristics such as slowness of the direct-voltage source are assumed to be included in block $G_2(s)$. If the transfer characteristics of block $G_1(s)$ of FIG. 3 are of the form:

$$G(s) = \frac{sc}{1 + RCs}$$

and assuming that R and C are constants, we have:

$$\Delta I \sim R \text{ and } dI/dt \sim 1/C$$

The set value A to be fed as an input, on the one hand determines E in an open circuit situation and on the other hand scales the characteristic quantities $\Delta I$ and $dI/dt$ of a short-circuit situation.

Figure 4:
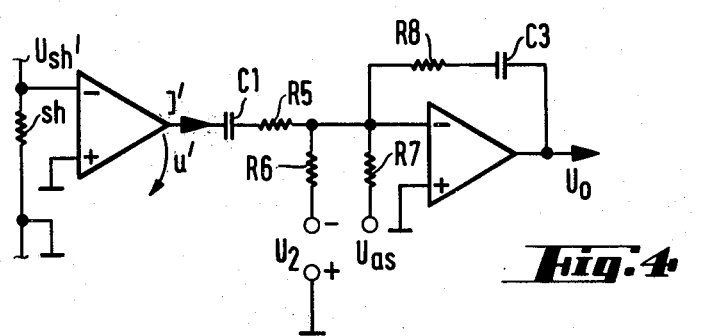
FIGS. 4 and 5 show sub-circuits of the coupling arrangement according to the invention.

A transfer function of the presented type $(u'/I')(s)$ can be obtained, for example, by means of a circuit according to FIG. 4, in which an input voltage $U_{sh}$, proportional to the current of the load, is taken over the shunt sh. In this case, $U_{sh} \sim I\Delta = $ load current $U_2 = $ load voltage $P = f(U_o) = $ power given by the controllable power source, in which case $\Delta I \sim R5$ and $dI/dt \sim 1/Cl$ are valid.

The controllable power source can be constructed using power semi-conductor components. The reaction time of the power source must, of course, be considerably shorter than the essential time constants of the process to be controlled. In MIG welding this requires reacting times of a few hundred microseconds at the most, which can be achieved with relative ease when using today's electronic components.

When welding using low currents, a flawless welding result requires that the light arc must not be cut off between the occurence of drop short-circuits. This is achieved, for example, by means of the control circuit coupling shown in FIG. 5, in which the static voltage-current dependence illustrated in FIG. 6 is obtained using a combination of resistors R3, R4, R6 and a diode D1. Therein the resistors R3 and R4 determine the steepness of the curve in cases of low currents, whereas the voltage of the conductive state of the diode D1 (for example approx. 0.7 V), together with the resistors R4 and R6 and the set-value branch $U_{as}$-R7, determines the constant voltage in cases of higher currents. Another procedure for preventing the cutting off of the light arc is to couple to the main current circuit a highly saturable choke, which in a known manner effectively prevents the cutting off of the current in cases of low currents. At higher currents the choke becomes saturated, in which case drop short-circuits are not broken by excessively high inductance. In practice these two methods can be combined as shown in FIG. 7, which illustrates the complete coupling.

Figure 7:
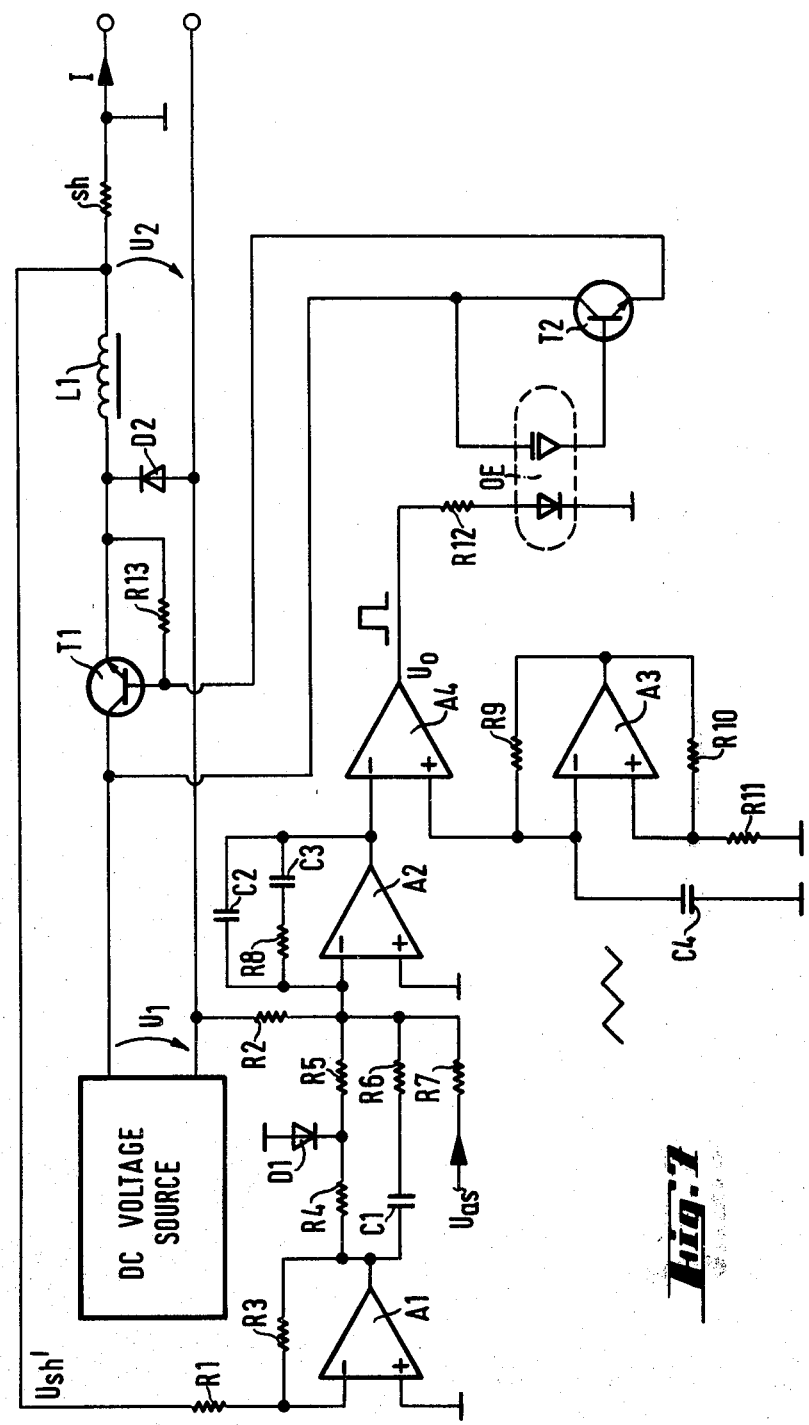
FIG. 7 shows as an example a complete arrangement according to the invention.

In the coupling shown in FIG. 7, the controlled source of electric power consists of a direct-voltage source, a series transistor T1, a saturable choke L1, a diode D2, and a shunt sh intended for measuring the current. The transistor T1 is controlled by a pulse-width modulator, and the pulse width given by this modulator is controlled by a control circuit as shown in previous FIGS. 4 and 5.

Figure 2A:
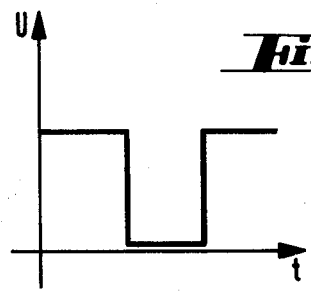
FIGS. 2a and 2b show the forms of the voltage and current associated with the coupling shown in FIG. 1.
Figure 2B:
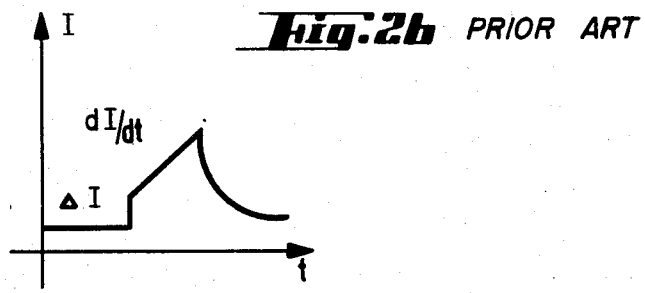
Figure 5:
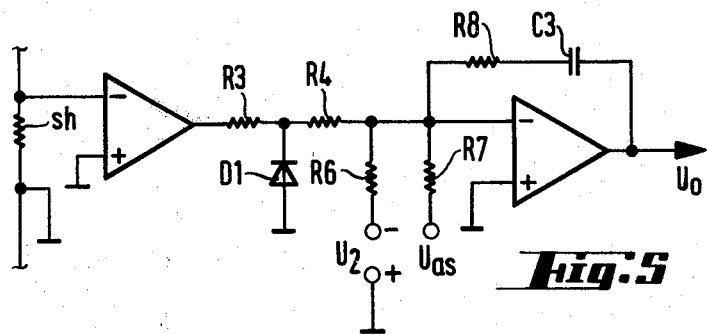

A voltage proportional to the load current is taken over the shunt sh, via the resistor R1 to the input of an operational amplifier A1, and the amplifiers A1 and A2, with the components linked thereto, correspond to the circuits shown in FIGS. 4 and 5. Next in succession to the amplifier A1 there have been coupled two branches in parallel, one of them being as shown in FIG. 4 and providing the desired dynamic characteristics (FIG. 2) and the other being as shown in FIG. 5 and providing the desired static or steady state characteristics (FIG. 6). The amplifier A 2 functions both as the difference-forming element of the control circuit and, together with the components C2, C3 and R8, realizes the desired dynamics. The circuit does not actually affect the curve shapes shown in FIG. 2, but in practice the circuit has been found to be necessary in order to achieve sufficient stability for the control loop.

The pulse-width modulator is composed of operational amplifiers a3 and A4, of which A3 is a triangular-wave generator and A4 functions as a comparator, and the frequency of its rectangular-wave output is determined by the triangular-wave generator. The pulse width, or duty cycle, for its part is determined by the output of A2, which is also dependent on the set value $U_{as}$.

The pulse-like output of the comparator A4 is used for controlling a transistor T2, which for its part controls the series transistor T1 of the main current circuit in a manner known per se. An optoisolator OE, for example, is used between the amplifier A4 and the base terminal of the transistor T2 in order to obtain galvanic isolation. The optoisolator and the control circuit of the main transistor in general are shown greatly simplified in the figure. It must be noted, however, that all these circuits are very well known to an expert in the art and that they can be implemented in many different ways without deviating from the basic idea of the invention.

In the case illustrated, the most important component values and types can be as follows, for example:

| | | | |
|---|---|---|---|
| R1 = 1 kΩ | R7 = 100 kΩ | C1 = 10nF  L1 = 0,2 mH | A1 = 741  T1 ESM 1000 |
| R2 = 400 kΩ | R8 = 250 kΩ | C2 = 2nF  saturable | A2 = 741  T2 BDY 58 |
| R3 = 100 kΩ | R9 = 10 kΩ | C3 = 50nF | A3 = 715 |
| R4 = 5 kΩ | R10 = 10 kΩ | C4 = 10nF | A4 = 715 |
| R5 = 20 kΩ | R11 = 10 kΩ | | |
| R6 = 100 kΩ | R12 = 500 Ω | | |
| | R13 = 10 Ω | | |

What is claimed is:

1. In a power supply coupling arrangement for a welding apparatus of a type suitable for MIG-welding, and which operates under conditions whereby at certain times a short-circuit occurs at the load and at other times an open-circuit occurs at the load, which arrangement includes a controllable electrical power source capable of supplying the current taken by the load over a given load voltage range, a first electrical circuit means that detects the current taken by the load and establishes an electrical signal corresponding to such load current, and a second electrical circuit means that detects the voltage applied to the load and establishes an electrical signal corresponding to such load voltage, the improvement which comprises in combination a third electrical circuit means coupled to said first and second electrical circuit means to receive therefrom said load current signal and said load voltage signal, and coupled to said electrical power source to control the current and voltage delivered to the load thereby in accordance with said load current and load voltage signals and predetermined response characteristics established by circuit elements of said third electrical circuit means, said response characteristics being such as to provide a given incremental step in the current delivered to the load and a prescribed rate of increase of said current in response to the occurence of a short-circuit at the load, said third electrical circuit means including a transistor connected in series with the load to regulate the current flow thereto, and a pulse-width modulator responsive to said load voltage and current signals and responsive to a command input signal to establish a pulse sequence output signal in which the pulse-width is determined by the instantaneous values of said load voltage and current signals and by said command input signal, said pulse sequence output signal being utilized to control the effective conductivity through said transistor.

2. The improvement according to claim 1 including circuit elements in said third electrical circuit means defining at least one input operable to establish a selected value of at least a corresponding one of said incremental current step and prescribed rate of current increase.

3. The improvement according to claim 2 wherein said input is operable to also establish the open-circuit voltage at the load.

4. The improvement according to claim 2 wherein said third electrical circuit means includes a resistor that establishes the value of said incremental current step, and a capacitor that aids in establishing the value of said prescribed rate of current increase.

5. The improvement according to claim 2 wherein said first, second and third electrical circuit means have a combined response time of less than one millisecond.

6. The improvement according to claim 2 including a resistor-diode network that aids in controlling the steady state load voltage-load current characteristic resulting from the combined action of said first, second and third electrical circuit means.

* * * * *